(12) United States Patent
    Plisic

(10) Patent No.: US 10,730,640 B2
(45) Date of Patent: Aug. 4, 2020

(54) LAUNCH SYSTEM APPARATUS

(71) Applicant: Milivoj Plisic, North Vancouver (CA)

(72) Inventor: Milivoj Plisic, North Vancouver (CA)

( * ) Notice: Subject to any disclaimer, the term of this patent is extended or adjusted under 35 U.S.C. 154(b) by 318 days.

(21) Appl. No.: 15/921,450

(22) Filed: Mar. 14, 2018

(65) Prior Publication Data
US 2019/0283900 A1    Sep. 19, 2019

(51) Int. Cl.
*B64F 1/04*    (2006.01)
*B64G 1/00*    (2006.01)

(52) U.S. Cl.
CPC ............ *B64F 1/04* (2013.01); *B64G 1/002* (2013.01)

(58) Field of Classification Search
CPC ....... B64F 1/04; B64G 1/002; B64C 2201/08; B64C 2201/084; B64C 2201/088
See application file for complete search history.

(56) References Cited

U.S. PATENT DOCUMENTS

| | | | | | |
|---|---|---|---|---|---|
| 1,686,298 | A | * | 10/1928 | Uhl | B64F 1/04 244/63 |
| 1,748,663 | A | * | 2/1930 | Tucker | B64F 1/04 244/63 |
| 1,842,432 | A | * | 1/1932 | Stanton | B64F 1/04 244/63 |
| 1,856,446 | A | * | 5/1932 | Vingheroets | B64F 1/04 244/115 |
| 3,989,206 | A | * | 11/1976 | Gregory | B64F 1/06 244/63 |
| 4,709,883 | A | * | 12/1987 | Giuliani | B64F 1/04 104/281 |
| 9,126,699 | B1 | * | 9/2015 | Fu | B64F 1/22 |
| 2018/0194496 | A1 | * | 7/2018 | Yaney | B64G 1/005 |

* cited by examiner

*Primary Examiner* — Philip J Bonzell
*Assistant Examiner* — Tye William Abell
(74) *Attorney, Agent, or Firm* — Charles Runyan

(57) ABSTRACT

A launch system including a tower having a platform affixed to the apex of the tower; at least one rotary ring, the at least one rotary ring including an inner-edge and an outer-edge circumscribing an inner-radius and an outer-radius of the at least one rotary ring respectively. A coupling-mechanism is configured to mate the inner-edge of the at least one rotary ring to the outer-edge of another of the at least one rotary ring. A gyroscopic stabilization device is configured to maintain a planar-relation between more than one rotary rings. A transverse-channel spans a diameter of the at least one rotary ring defining a path for cargo to traverse the diameter of the at least one rotary ring. The launch system is configured to utilize a centrifugal force generated by rotating the at least one rotary ring to launch a cargo into atmosphere.

17 Claims, 4 Drawing Sheets

LAUNCH SYSTEM APPARATUS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of aerospace systems of existing art and more specifically relates to launching systems.

RELATED ART

Launching cargo into the upper atmosphere and beyond is an expensive endeavor. Reports for a government funded satellite launch costs hundreds of millions of dollars per unit. These costs are multiplied per satellite many times as the need for more satellites steadily increases. These government funded space launch endeavors are typically powered through the use of combustible fuels. Privatized space companies are becoming more and more prevalent at the advent of new technologies. These technologies attempt to reduce the cost of lifting a cargo through the atmosphere and beyond.

U.S. Pat. No. 4,709,883 to Robert L. Giuliani relates to a launch and ascent system. The described launch and ascent system includes magnetic levitation in combination with magnetic propulsion (MAGLEV) to accelerate an aircraft of spacecraft—or both crafts as a coupled unit—from standstill along a guideway to the highest possible launch velocity. The acceleration along the guideway is fuel efficient. The craft(s) are brought to launch velocity without using on board fuel. The computer controlled acceleration along the guideway could avoid high g forces to prevent damage to fragile payloads. The guideway may be sectionalized and of any shape. One section, for instance, may be circular to permit a long magnetically accelerated run with a relatively short length guideway. Very heavy crafts and payloads can be launched with superconducting levitation magnets in the guideway which form strong repulsive force fields with superconducting magnets in the MAGLEV vehicle. In another embodiment, the invention includes attraction magnets for the levitation. The invention could operate in an airless environment, such as the moon, to launch rocket powered spacecraft with their payloads. On earth, the invention could launch a rocket powered spacecraft coupled to an aircraft having air breathing engines. The aircraft would power the spacecraft to a staging altitude, where the spacecraft would actuate its own rocket engines for propulsion beyond the atmosphere, and separate from the aircraft. Unlike the space shuttle, all major components of the invention's space launch would be recovered for reuse. The invention may be multipurpose for serving to efficiently launch conventional aircraft. With a circular guideway, takeoff is inherently omnidirectional to take advantage of launch conditions.

SUMMARY OF THE INVENTION

In view of the foregoing disadvantages inherent in the known aerospace system art, the present disclosure provides a novel launch system. The general purpose of the present disclosure, which will be described subsequently, is to provide an efficient launch system. The launch system includes a tower, the tower defined by an apex and a base, the base configured to provide upright support to the apex relative to a substantially planar surface. A platform is affixed to the apex of the tower, the platform including at least one platform-edge circumscribing the platform. At least one rotary ring is included, the at least one rotary ring including an inner-edge circumscribing an inner-radius of the at least one rotary ring, the at least one rotary ring further including an outer-edge circumscribing an outer-radius of the at least one rotary ring. A coupling-mechanism is configured to mate the inner-edge of the at least one rotary ring to the outer-edge of another of the at least one rotary ring, the coupling-mechanism including a lip protruding about a periphery of the outer-edge of the at least one rotary ring and, a guide-flange disposed about the of the at least one rotary ring. The guide-flange is configured to mate with the lip.

A gyroscopic stabilization device is affixed to the at least one rotary ring, the gyroscopic stabilization device is configured to maintain a planar-relation between more than one rotary ring(s). The gyroscopic stabilization device includes a wheel attached to a mount; the wheel is configured to provide angular momentum to maintain the planar-relation. A transverse-channel spans a diameter of the at least one rotary ring. The transverse channel defines a path for cargo to traverse the diameter of the at least one rotary ring. The launch system is configured to utilize a centrifugal force generated by rotating the at least one rotary ring to launch a cargo into the atmosphere.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a launch system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to an aerospace system and more particularly to a launch system as used to improve the ascending of cargo.

Generally, economical access to space is a goal that is made difficult mostly by gravity. Artificial gravity is associated with rotation and revolution is a good place to look for solutions to the challenges of gravity. As we observe the general shape of solar systems, galaxies, and even planets like Saturn with their rings, we see a pattern that seems to point to a solution to the gravity challenge. Provided is a novel approach to carry cargo into the upper atmosphere and beyond by harnessing centrifugal force. The present invention is a launch system comprising numerous concentric rings. The rings will rotate about a large tower mounted into a terrestrial region that will act as a rotational axis and keep the rings elevated from the terrestrial surface. The rings feature gyroscopic stabilizers that counteract induced precession of the rotating disks caused in part by the rotation of the planet. A channel transverses the rings from the central axis of rotation to the outermost ring that will be used for cargo. Cargo will then be accelerated due to the centrifugal force and launched in a direction substantially tangent to the launch system.

Referring now more specifically to the drawings by numerals of reference, there is shown in FIGS. 1-4, various views of a launch system 100.

Figure 1:
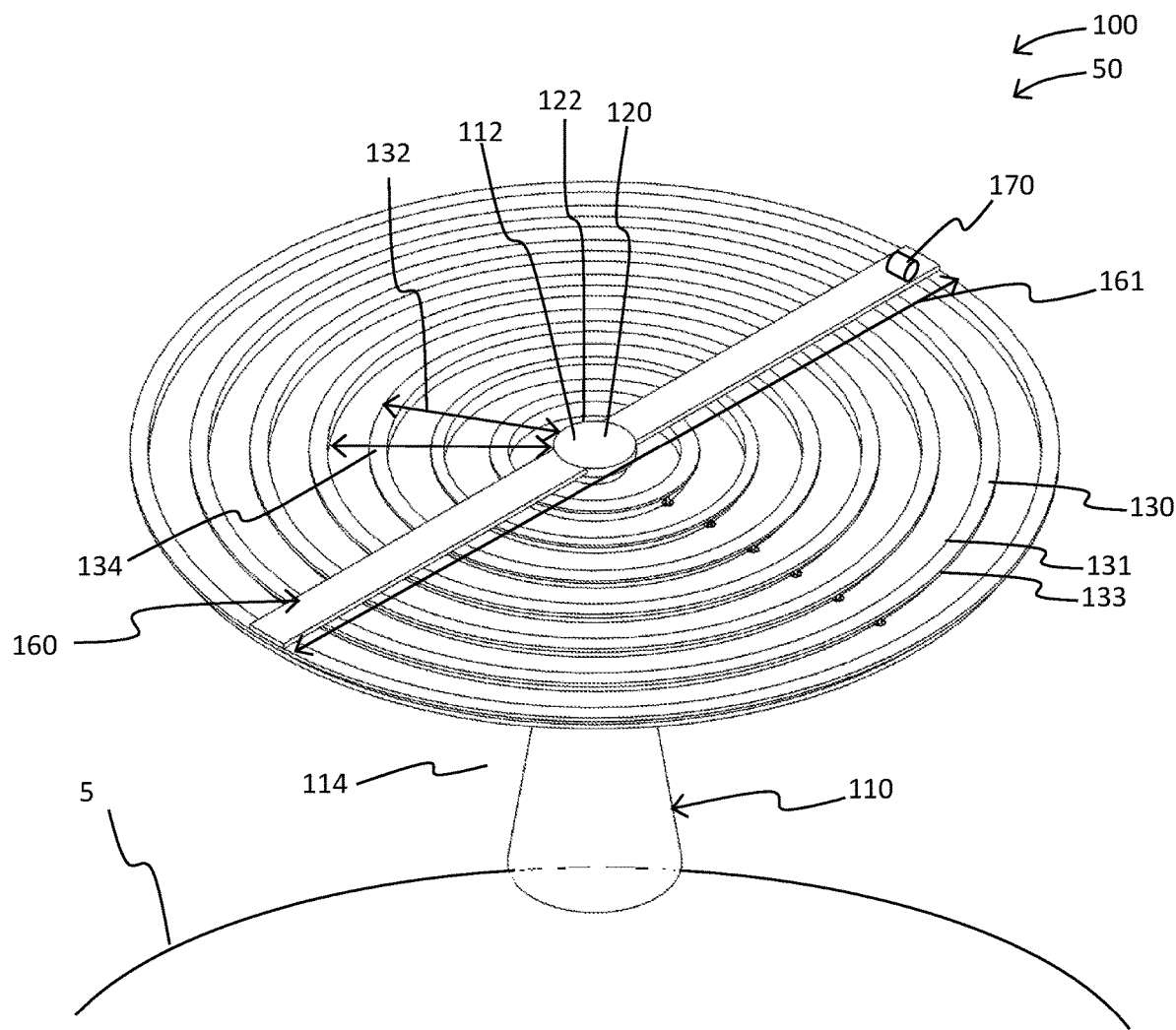
FIG. 1 is a top perspective view of the launch system during an 'in-use' condition, according to an embodiment of the disclosure.

FIG. 1 shows a launch system 100 during an 'in-use' condition 50, according to an embodiment of the present disclosure. Here, the launch system 100 may be beneficial to ascend cargo into the upper atmosphere and beyond. As illustrated, the launch system 100 may include a tower 110 defined by an apex 112 and a base 114; the base 114 configured to provide upright support to the apex 112 relative to a terrestrial body 5. A platform 120 is affixed to the apex 112 of the tower 110; the platform 120 including at least one platform-edge 122 circumscribing the platform 120. At least one rotary ring 130 is also included, the at least one rotary ring 130 including an inner-edge 131 circumscribing an inner-radius 132 of the at least one rotary ring 130. The at least one rotary ring 130 further includes an outer-edge 133 circumscribing an outer-radius 134 of the at least one rotary ring 130.

The launch system 100 includes a coupling-mechanism 140 (FIG. 4) configured to mate the inner-edge 131 of the at least one rotary ring 130 to the outer-edge 133 of another of the at least one rotary rings 130. The coupling-mechanism 140 includes a lip 142 (FIG. 4) protruding about a periphery of the outer-edge 133 of the at least one rotary ring 130 and, a guide-flange 144 (FIG. 4) disposed about the inner-edge 131 of the at least one rotary ring 130. The guide-flange 144 is configured to mate with the lip 142.

Figure 4:
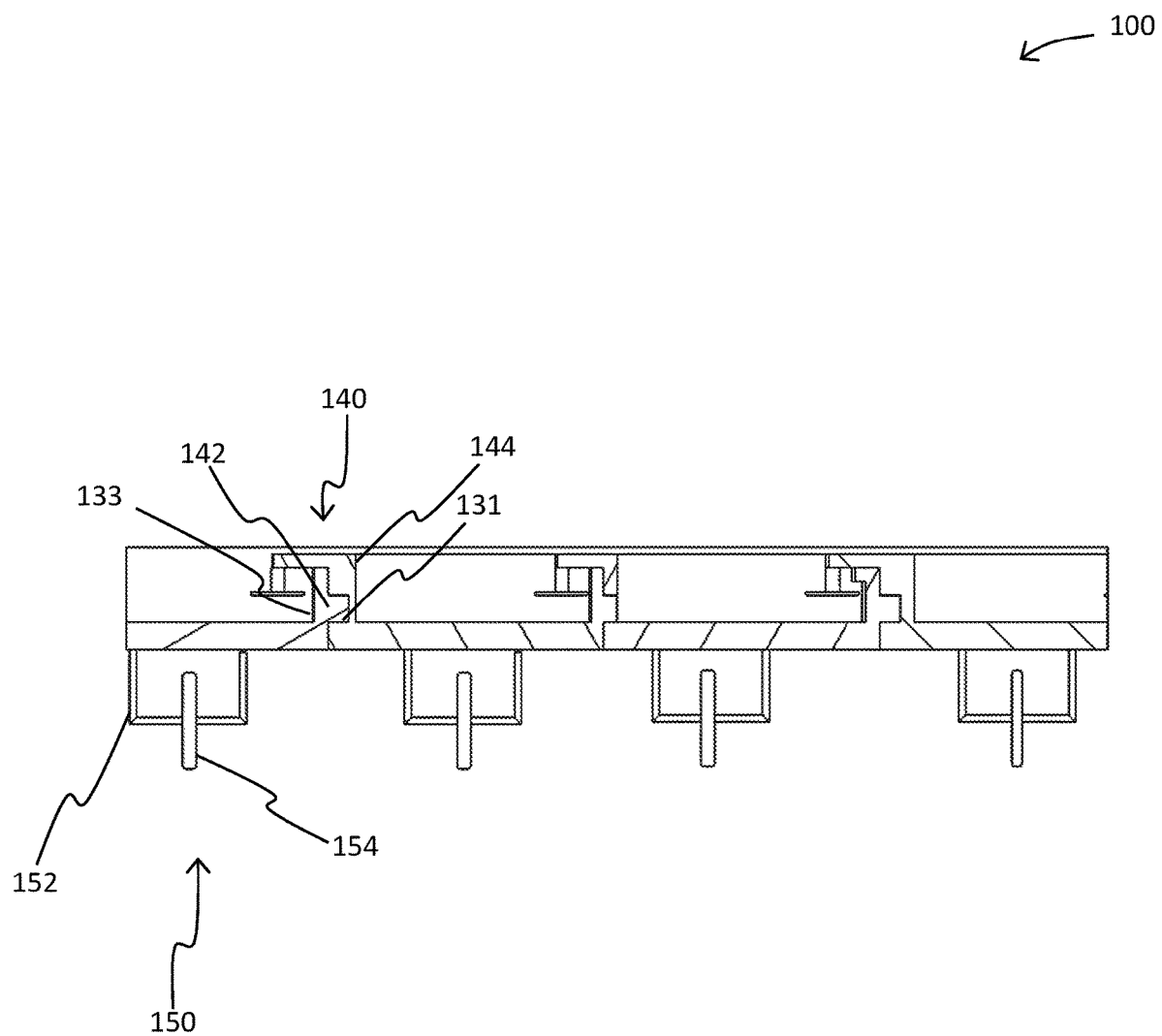
FIG. 4 is a cutaway view of the launch system of FIG. 1, according to an embodiment of the present disclosure.

The launch system 100 further includes a gyroscopic stabilization device 150 (FIG. 4) affixed to the at least one rotary ring 130. The gyroscopic stabilization device 150 is configured to maintain a planar-relation between more than one rotary rings. The gyroscopic stabilization device 150 includes a wheel 154 (FIG. 4) attached to a mount 152 (FIG. 4). The wheel 154 is configured to provide angular momentum to maintain the planar-relation. A transverse-channel 160 spans a diameter 161 of the at least one rotary ring 130. The transverse-channel 160 defines a path for a cargo 170 to traverse the diameter 161 of the at least one rotary ring 130. The launch system 100 is configured to utilize a centrifugal force generated by rotating the at least one rotary ring 130 to launch the cargo 170 into atmosphere.

Figure 2:
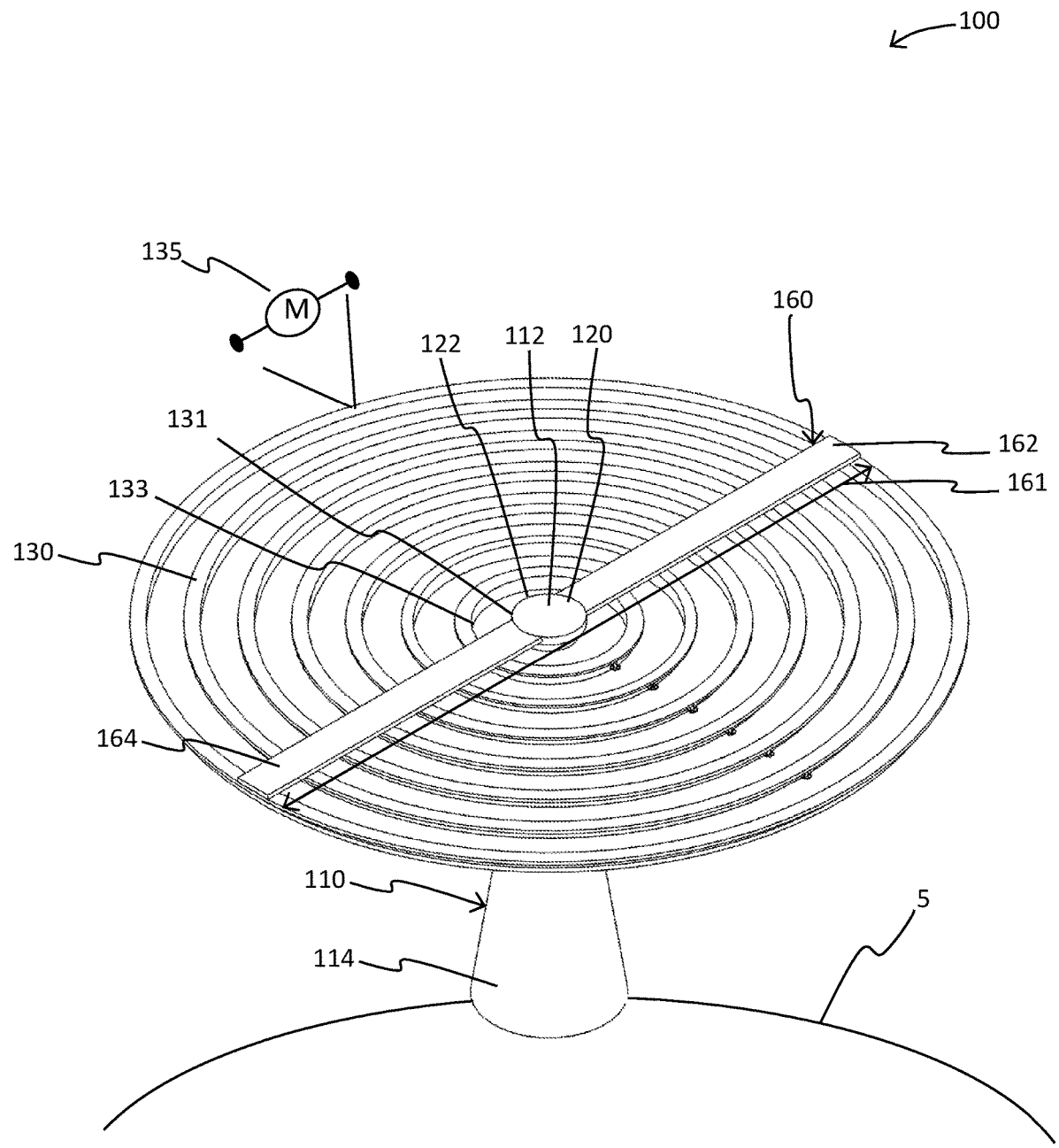
FIG. 2 is a top perspective view of the launch system of FIG. 1, according to an embodiment of the present disclosure.

FIG. 2 shows the launch system 100 of FIG. 1, according to an embodiment of the present disclosure. As above, the launch system 100 may include a tower 110; the tower 110 defined by an apex 112 and a base 114. The base 114 is configured to provide upright support to the apex 112 relative to a terrestrial body 5. The tower 110 may be located at a geographic pole region of the terrestrial body 5, where the base 114 is at least partially buried into the terrestrial body 5. A platform 120 is affixed to the apex 112 of the tower 110; the platform 120 including at least one platform-edge 122 circumscribing the platform 120. At least one rotary ring 130 is included, the at least one rotary ring 130 including an inner-edge 131 and an outer-edge 133.

A transverse-channel 160 spans a diameter 161 of the at least one rotary ring 130. The transverse-channel 160 includes a launch-channel 162. The launch-channel 162 is in proximal communication with the platform-edge 122 of the platform 120, and proximally affixed to the outer-edge 133 of the at least one rotary ring 130. The transverse-channel 160 further includes a balance-channel 164 in parallel alignment with the launch-channel 162. The balance-channel 164 is in communication with the platform-edge 122 of the platform, and distally affixed to the outer-edge 133 of the at least one rotary ring 130.

The platform-edge 122 of the platform 120 is configured to mate with the inner-edge 131 of the at least one rotary ring 130. The launch system 100 is designed such that the at least one rotary rings 130 is/are in sequential concentric formation outwardly increasing in diameter from the platform 120. The alignment of the at least one rotary rings 130 are such that the inner-radius 132 (FIG. 1) of at least one rotary ring 130 is equal to the outer-radius 134 (FIG. 1) of another at least one rotary ring 130. A ring-motor 135 is affixed to the at least one rotary ring 130, and in frictional contact with another at least one rotary ring 130. The ring-motor 135 is configured to rotate the at least one rotary ring 130.

Figure 3:
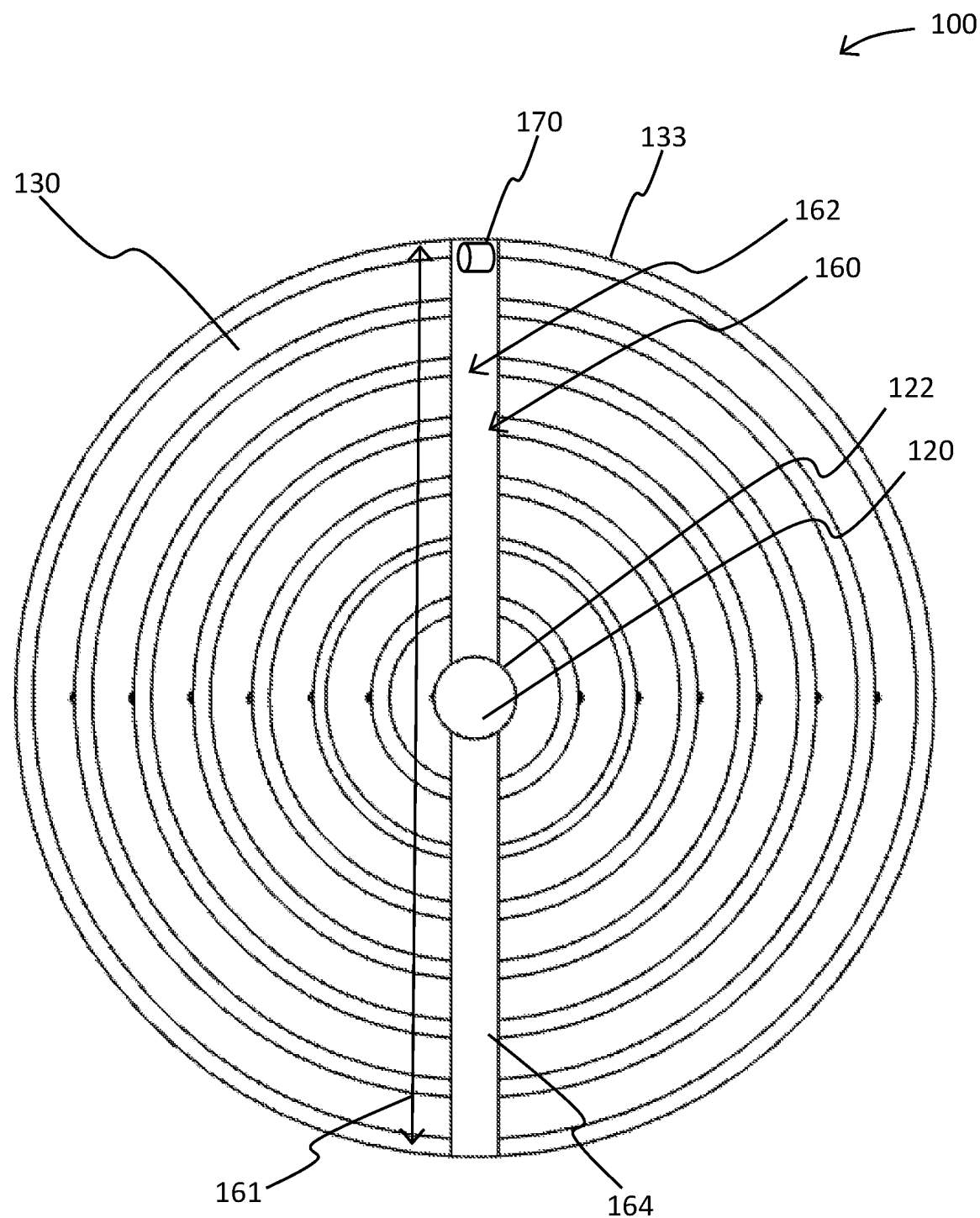
FIG. 3 is a top view of the launch system of FIG. 1, according to an embodiment of the present disclosure.

Referring now to FIG. 3, a top view of the launch system 100 of FIG. 1, according to an embodiment of the present disclosure. The present illustration clearly shows the launch system 100 having a transverse-channel 160 spanning a diameter 161 of the at least one rotary ring 130. The transverse-channel 160 defines a path for a cargo 170 to traverse the diameter 161 of the at least one rotary ring 130. The illustration further shows a launch-channel 162 in proximal communication with the platform-edge 122 of the platform 120 and affixed to the outer-edge 133 of the at least one rotary ring 130. A balance-channel 164 is also shown in parallel alignment with the launch-channel 162. The balance-channel 164 is in communication with the platform-edge 122 of the platform 120 and affixed to the outer-edge 133 of the at least one rotary ring 130. The present illustration further depicts the sequential concentric formation of the at least one rotary rings 130 outwardly increasing in diameter from the platform 120. The launch-channel 162 may be configured to allow rotation of the at least one rotary ring 130 beneath the launch-channel 162. The launch-channel 162 and the balance-channel 164 are configured to be equal and opposite in size, location, and capacity.

FIG. 4 is a cutaway view of the launch system 100 of FIG. 1, according to an embodiment of the present disclosure. As shown, the launch system 100 includes a coupling-mechanism 140 that is configured to mate the inner-edge 131 of the at least one rotary ring 130 (FIG. 1) to the outer-edge 133 of another of the at least one rotary ring 130. The coupling-mechanism 140 includes a lip 142 protruding about a periphery of the outer-edge 133 of the at least one rotary ring 130 and, a guide-flange 144 disposed about the inner-edge 131 of the at least one rotary ring 130. The guide-flange 144 is configured to mate with the lip 142.

Also shown is the gyroscopic stabilization device 150 affixed to the at least one rotary ring 130. The gyroscopic stabilization device 150 is configured to maintain a planar-relation between more than one rotary rings. The gyroscopic stabilization device 150 includes a wheel 154 attached to a mount 152, the wheel 154 is configured to provide angular momentum to maintain the planar-relation. The wheel 154 of the gyroscopic stabilization device 150 is weighted to 'increase' inertia.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:

1. A launch system comprising:
   a tower, the tower defined by an apex and a base, the base configured to provide upright support to the apex relative to a substantially planar surface;
   a platform affixed to the apex of the tower, the platform including at least one platform-edge circumscribing the platform;
   at least one rotary ring, the at least one rotary ring including an inner-edge circumscribing an inner-radius of the at least one rotary ring, the at least one rotary ring further including an outer-edge circumscribing an outer-radius of the at least one rotary ring;
   a coupling-mechanism configured to mate the inner-edge of the at least one rotary ring to the outer-edge of another of the at least one rotary ring, the coupling-mechanism including a lip protruding about a periphery of the outer-edge of the at least one rotary ring and, a guide-flange disposed about the inner-edge of the at least one rotary ring, the guide-flange configured to mate with the lip;
   a gyroscopic stabilization device affixed to the at least one rotary ring, the gyroscopic stabilization device configured to maintain a planar-relation between more than one rotary rings, the gyroscopic stabilization device including a wheel attached to a mount, the wheel configured to provide angular momentum to maintain the planar-relation;
   a transverse-channel spanning a diameter of the at least one rotary ring, the transverse channel defining a path for cargo to traverse the diameter of the at least one rotary ring; and
   wherein the launch system is configured to utilize a centrifugal force generated by rotating the at least one rotary ring to launch a cargo into atmosphere.

2. The launch system of claim 1, wherein the tower is located at a geographic pole region of a terrestrial body.

3. The launch system of claim 1, wherein the tower-body is at least partially buried into the terrestrial body.

4. The launch system of claim 1, wherein the platform-edge of the platform is configured to mate with the inner-edge of the at least one rotary ring.

5. The launch system of claim 1, wherein the at least one rotary ring are concentric such that the inner-radius of at least one rotary ring is equal to the outer-radius of another at least one rotary ring.

6. The launch system of claim 1, wherein the coupling-mechanism further includes magnetic repulsion configured to reduce friction between moving parts.

7. The launch system of claim 1, wherein the transverse-channel includes a launch-channel, the launch-channel in proximal communication with the platform-edge of the platform, and proximally affixed to the outer-edge of the at least one rotary ring.

8. The launch system of claim 1, wherein the transverse-channel includes a balance-channel in parallel alignment with the launch-channel, the balance-channel in communication with the platform-edge of the platform, and distally affixed to the outer-edge of the at least one rotary ring.

9. The launch system of claim 1, wherein the wheel of the gyroscopic stabilization device is weighted to increase inertia.

10. The launch system of claim 1, wherein the launch-channel is configured to allow rotation of the at least one rotary ring beneath the launch-channel.

11. The launch system of claim 1, wherein the launch-channel and the balance-channel are configured to be equal and opposite in size, location, and capacity.

12. The launch system of claim 1, wherein the launch system includes electrical power to power the ring-motor and the gyroscopic stabilization device.

13. The launch system of claim 1, wherein the at least one rotary ring includes a reinforcement mesh configured to increase strength of the launch system.

14. The launch system of claim 1, wherein the at least one rotary ring is constructed of a carbon fiber, or alternatively, other similar material.

15. The launch system of claim 1, wherein the at least one rotary rings is/are nested in sequential concentric formation outwardly increasing in diameter from the platform.

16. The launch system of claim 15, wherein a ring-motor is affixed to the at least one rotary ring, and in frictional contact with another said at least one rotary ring, the ring-motor configured to rotate the at least one rotary ring.

17. A launch system, the launch system comprising:
   a tower, the tower defined by an apex and a base, the base configured to provide upright support to the apex relative to a substantially planar surface;
   a platform affixed to the apex of the tower, the platform including at least one platform-edge circumscribing the platform;
   at least one rotary ring, the at least one rotary ring including an inner-edge circumscribing an inner-radius of the at least one rotary ring, the at least one rotary ring further including an outer-edge circumscribing an outer-radius of the at least one rotary ring;
   a coupling-mechanism configured to mate the inner-edge of the at least one rotary ring to the outer-edge of another of the at least one rotary ring, the coupling-mechanism including a lip protruding about a periphery of the outer-edge of the at least one rotary ring and, a guide-flange disposed about the inner-edge of the at least one rotary ring, the guide-flange configured to mate with the lip;
   a gyroscopic stabilization device affixed to the at least one rotary ring, the gyroscopic stabilization device configured to maintain a planar-relation between more than one rotary rings, the gyroscopic stabilization device including a wheel attached to a mount, the wheel configured to provide angular momentum to maintain the planar-relation;

a transverse-channel spanning a diameter of the at least one rotary ring, the transverse channel defining a path for cargo to traverse the diameter of the at least one rotary ring;

wherein the launch system is configured to utilize a centrifugal force generated by rotating the at least one rotary ring to launch a cargo into an atmosphere;

wherein the tower is located at a geographic pole region of a terrestrial body;

wherein the tower-body is at least partially buried into the terrestrial body;

wherein the platform-edge of the platform is configured to mate with the inner-edge of the at least one rotary ring;

wherein the at least one rotary ring are concentric such that the inner-radius of at least one rotary ring is equal to the outer-radius of another at least one rotary ring;

wherein the coupling-mechanism further comprises magnetic repulsion configured to reduce friction between moving parts;

wherein the transverse-channel includes a launch-channel, the launch-channel in proximal communication with the platform-edge of the platform, and proximally affixed to the outer-edge of the at least one rotary ring;

wherein the transverse-channel includes a balance-channel in parallel alignment with the launch-channel, the balance-channel in communication with the platform-edge of the platform, and distally affixed to the outer-edge of the at least one rotary ring;

wherein the at least one rotary rings are nested in sequential concentric formation outwardly increasing in diameter from the platform;

wherein a ring-motor is affixed to the at least one rotary ring, and in frictional contact with another said at least one rotary ring, the ring-motor configured to rotate the at least one rotary ring;

wherein the wheel of the gyroscopic stabilization device is weighted to increase inertia, wherein the launch-channel is configured to allow rotation of the at least one rotary ring beneath the launch-channel;

wherein the launch-channel and the balance-channel are configured to be equal and opposite in size, location, and capacity;

wherein the launch system includes electrical power to power the ring-motor and the gyroscopic stabilization device;

wherein the at least one rotary ring includes a reinforcement mesh configured to increase strength of the launch system; and wherein the at least one rotary ring is constructed of a carbon fiber.

* * * * *